United States Patent Office 3,386,796
Patented June 4, 1968

3,386,796
DRY-CLEANING OPERATION
Otis R. Videen, St. Paul, Minn., assignor to Conwed Corporation, a corporation of Delaware
Filed Mar. 17, 1964, Ser. No. 352,545
10 Claims. (Cl. 8—142)

ABSTRACT OF THE DISCLOSURE

In the operation of a dry-cleaning system the effective life of the filter is extended by (1) maintaining the acid number at or below 0.16 while simultaneously (2) maintaining the solvent free of water in excess of 50% of its capacity to dissolve water.

The present invention relates to dry-cleaning of clothes, and in particular, to the method and means for prolonging the useful life of a filter in a recirculation system for used solvent.

The invention is directed more particularly to the use of perchlorethylene solvent as used in coin-operated dry-cleaning establishments. Coin-operated machines are commonly arranged in a bank of units, and the solvent system may be limited to a single unit or be common to two or more units.

In these units a supply of solvent is drawn upon and recirculated repeatedly in a system wherein it is treated for reuse. An important treatment is filtration to remove the dirt and debris released from the clothes. Various forms of filters may be used. Preferably, such a filter is disposable and when it becomes unserviceable by repeated use, it is discarded and a new one supplied.

It is the aim in successful operation of dry-cleaning establishments to use one filter for as many loadings of the units as possible. Difficulties have been met in this direction by relatively early failure of a filter to function adequately. Use of a filter deposits dirt and debris on an original filter medium and the deposit then becomes part of the filter. Decreasing functioning of the filter is indicated by a rise in the differential pressure of the liquid across the filter.

The present invention is based upon the discovery that the increase in differential pressure is due to increased plugging of the filter in use, not wholly by the suspended solids, but by non-particulate material carried by the solvent to be filtered.

This invention is based on the discovery that among the materials which lead to plugging the filter are an excess of water content, and an excess of so-called dissolved non-volatiles other than water-soluble detergent. It has long been known that used solvent to be filtered is acidic, due to acids extracted from the clothes, for example, perspiration stains in the clothes. These constitute dissolved non-volatile solids other than detergent. The industry has long set standards for the content of such dissolved non-volatile solids. The standard involves calculating the acid content in terms of one of the fatty acids, namely, oleic acid, and sets a limiting content thereof such that the acid number of the solvent be not over 0.3. An acid number of 0.3 corresponds to 0.14% oleic acid.

The acid number is defined as the milligrams of potassium hydroxide required to neutralize the acid in one gram of the solvent. The acid number of perchlorethylene solvent is determined by titrating it, using phenolphthalein indicator, with a standard alcohol solution containing 0.1 mole of KOH per liter.

The presence of the acid derived from the clothes results in a residue of it when solvent is dried from the clothes after the cleaning operation. An excess of it may leave an odor in the dried clothes, or odors may develop due to development of rancidity in the extracted fatty compounds. To avoid these residual odors, the industry has set said maximum for the acid number as 0.3.

The present invention arises from the discovery that used solvent having an acid number near or above said prescribed maximum of 0.3 is one cause of early increase in differential pressure across the filter. Another cause is an excess of water content in the solvent. Water can enter the solvent by frequent departures from good practice, such as subjecting wet clothing to the solvent for cleaning, or otherwise, introducing free water. Water content cannot be entirely eliminated because the solvent has a limited capacity to dissolve water and some water is desirable. The solubility of water in 100 grams of perchlorethylene is 0.0105 gram. However, the presence of water-soluble detergent increases the solubility of water in the detergent solvent. Normal clothing holds moisture, and in cleaning them, there is an interchange of water between solvent and clothes to reach an equilibrium distribution.

In using perchlorethylene for dry-cleaning a suitable detergent is added which is a liquid one soluble in water and in perchlorethylene, such as a petroleum sulfonate salt. This contributes to the content of dissolved non-volatile solids, all of which form undesirable residue in the cleaned clothes. Therefore, another standard set by the industry is 1.5 grams per 100 ml. of soluble non-volatile solids in the solvent other than the detergent.

The present invention is based upon studies of used solvent composition and filter life. It has been found that a high acid number, even less than the specified maximum of 0.3, and/or a high content of water, are causes of early filter failure. It has been found that when the acid number is not over 0.16, during the major portion of the time a filter is in use, the filter life is greatly prolonged, but only in case the water content is not over about 50% of the capacity of the solvent to dissolve water. When the water present exceeds the capacity to dissolve water, this is evidenced first by cloudiness due to an emulsion of the water-in-oil type. This capacity is determined by the solvent composition which in reused solvent comprises perchloroethylene and accumulated detergent dissolved therein. The more non-volatile water-soluble detergent present, the more dissolved water the solvent may hold.

In commercial practice where the maximum acid number of 0.3 is permitted, the filter in the form of a cartridge has an acceptably long life because filter-aids are added which are adsorbents of the material determined as oleic acid. However, such filter aids also load the filter and to a degree shorten its life. In practicing the present invention by lowering said permitted maximum from 0.3 to 0.16, the operations may be carried out without using such filter aids, thus lowering costs, lowering the load on the filter, and prolonging filter life, subject, however, to the limitation that the water content does not exceed the above-described maximum of approximately 50% of the capacity of the solvent to dissolve water.

The invention is explained by reference to the accompanying drawings, in which.

Figure 1:
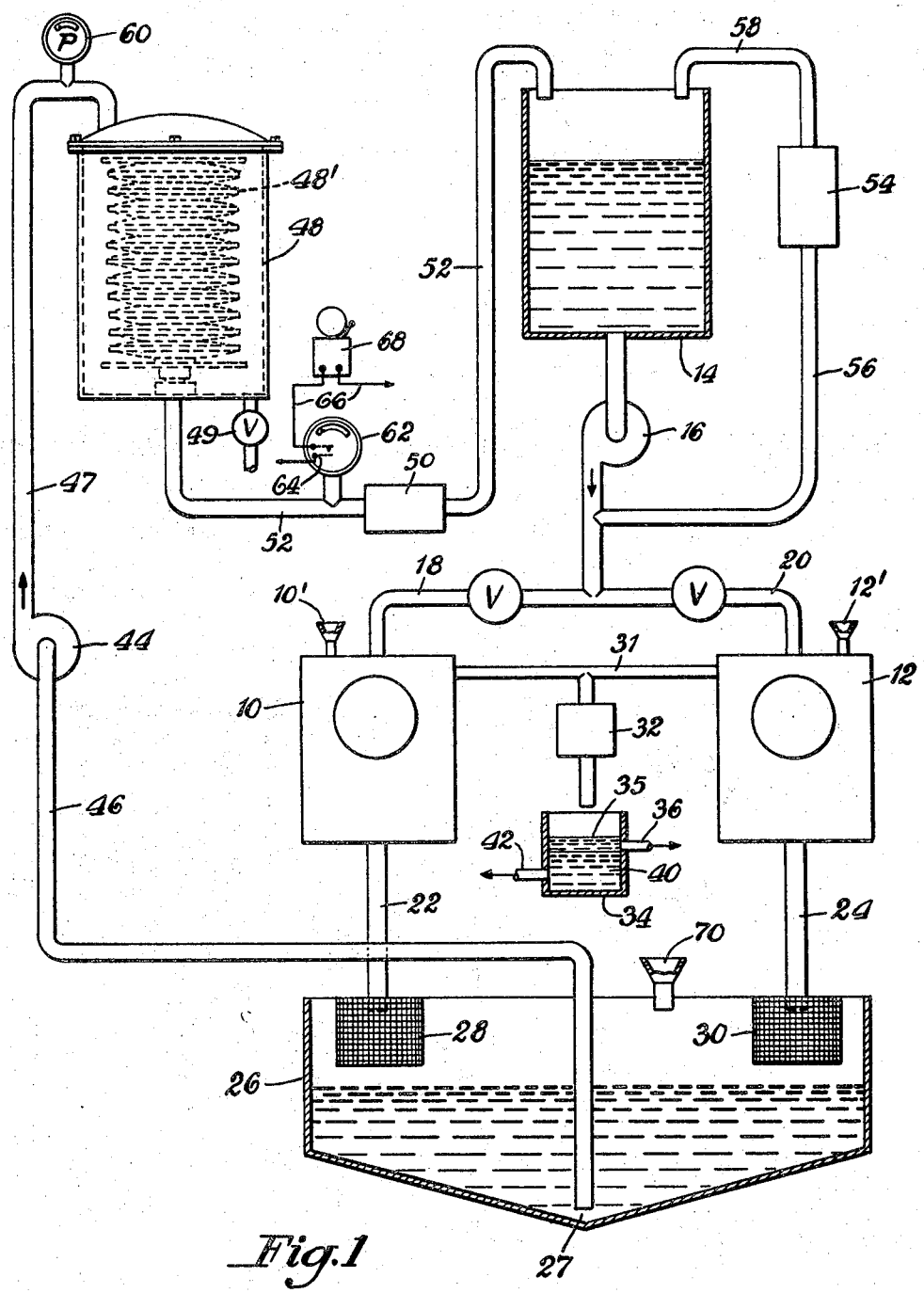
FIG. 1 is a diagrammatic representation of the mechanical units and connections for a solvent system supplying two units.

FIG. 1 is representative of a dry-cleaning system. It indicates two self-service dry-cleaning units 10 and 12, such as those available to the public for use, each having an orifice 10' and 12' into which may be fed a prescribed amount of detergent. A supply of perchloroethylene is stored in tank 14, from which a pump 16 delivers it through valved supply lines 18 and 20, respectively, to units 10 and 12. Units 10 and 12 discharge used fluid through connections 22 and 24 into a used-fluid tank 26, through baskets 28 and 30 in the tank to catch pins, buttons, and other foreign articles. The bottom of tank 26 slopes to a sump area 27 to concentrate suspended dirt, from which area the liquid is pumped with dirt.

After cleaning, hot air is passed through the clothes to drive off residual solvent and any water. The vapors enter conduit 31 and go to a condenser 32 from which liquid is discharged into a separator 34 from which a floating water layer 35 may be drawn off as waste at 36, and from which the solvent layer 40 is discharged through connection 42 for return to the system at any desired point, such as into the tank 14 or tank 26. It is important to remove such water from the system, for reasons pertaining to the objectives of the present invention.

The used solvent is moved by a pump 44 from the tank bottom area 27 through its inlet connection 46 and its outlet connection 47 to a filter tank 48 holding filter cartridge 48' which discharges through a standard constant-flow valve 50 in connection 52 leading to storage tank 14. Filter tank 48 can be opened and closed to change the filter cartridge. Valve 49 at the bottom of tank 48 permits draining liquid from the tank before removing the filter unit.

The stored liquid in tank 14 is decolorized by passing it through a container 54 having a bed of decolorizer, such as adsorbing carbon. The container 54 is fed through connection 56 from the outlet side of pump 16. Container 54 discharges into storage tank 14, through connection 58. Thus, pump 16 may be operated continuously to circulate liquid while the valved supply lines 18 and 20 are closed.

At the entrance to filter tank 48 there is a pressure guage 60 to indicate the pressure in conduit 47, which pressure is maintained substantially constant by action of pump 44. At the exit of the filter tank 48 and between it and said flow-control valve 50 there is a pressure guage 62 to indicate the pressure in conduit 52 at the entrance to the constant-flow valve 50. The difference in readings of the two pressure guages gives the pressure differential across the filter. Because the pressure in guage 60 is substantially constant, a drop in pressure at guage 62 indicates increasing differential pressure across the filter. The flow-control valve 50 operates automatically to maintain constant flow in connection 52 in spite of changing applied pressure at its inlet, but within a range characteristic of the particular valve. Valves such as valve 50 have limitations in that when the inlet pressure is below a critical value which is characteristic of the particular valve, it cannot yield the said constant flow. As the pressure drops below the critical value the rate of flow also drops. Thus, when the flow is reduced to an ineffective rate, evident by the indicated pressure at guage 62, which rate is in a range predetermined by calibration, it is a signal not only of excessive increase in pressure across the filter, but also of such an increase that the desired flow through the filter is not taking place. At this stage the filter must be changed. When a substantially constant fixed pressure is not maintained in the inlet connection 47 to tank 48, the pressure guage 62 functions as a signalling means for drop in pressure at the outlet of the filter.

The illustrated guage 62 may be one having an electrical contact represented at 64 with an electrical connection 66 to a signal 68, such as a light or bell. By the described control of the reused solvent the filter life is prolonged until a change is signalled by the pressure conditions in the system.

As described hereinafter, the acid number of the solvent being recycled can be maintained low by use of additives which can be suspended in the liquid, and after performing their function, be separated from the resulting treated solvent by collection on the filter. In FIG. 1, the orifice 70 at the used-fluid tank 26 represents one place where such an additive may be added to the liquid and later filtered out.

It has been determined that with new perchlorethylene substantially free of dissolved non-volatiles except detergent, a content of water above the saturated dissolved content has no bad effect on "blinding" the filter. But, after considerable use of the liquid in recycling it, the combination of such high water content and of dissolved non-volatiles including detergent, leads to a slime which blinds the filter and calls for an early change of filter. This blinding effect does not occur when the acid number is maintained at a value not over 0.16 and when the water content is not over 50% of the capacity of the liquid to dissolve water. No authentic explanation is given, but it is suspected that the action taken to remove and hold down the titratable acid, also removes non-volatile solids which in part at least contribute to the slime formation. It has been found that long life to the filter results from action to keep the acid number not over 0.16 in a solvent in which the water content is not over 50% of its capacity to dissolve water.

One way to maintain a low acid number is to remove some solvent and replace it with fresh perchlorethylene. In the conventional unit, such a change of about 1% of the total solvent in the system per 8-lb. load is sufficient, effected at about 10-load intervals or less. The removed solvent can be collected and distilled so that it is not lost to the establishment.

Another way is to add a non-caking adsorbent, such as magnesium oxide, magnesium silicate, adsorbent carbon, and specially treated diatomaceous earth, for adsorbing dissolved non-volatiles. The preferred one is a finely divided synthetic magnesium silicate at a particle-size-distribution which does not cake. This is effective by adding it to the tank 26, as at the orifice 70, so that it is thereafter removed in the filter tank 48. For a commercial unit about 10 grams per 8-lb. load results in long filter life.

When a finely ground caking form of magnesium silicate is used there is also used with it a quantity of any well-known filter aid to open up such a cake, for example, an equal quantity of diatomaceous earth or perlite.

It is recognized that sorbents vary in their selectivity, a fact well known to those skilled in the art. Of pertinence to the present invention, it is stated that the decolorizing carbon in container 54 is poor sorbent for dissolved non-volatiles, and the magnesium silicate is a poor sorbent for color.

Among the dissolved non-volatiles is the detergent. The magnesium silicate is an adsorbent for detergent, so that as detergent residue is removed, so is the capacity to dissolve water reduced. For long filter life, the amount of detergent added per load is preferably maintained on the low side.

Figure 2:
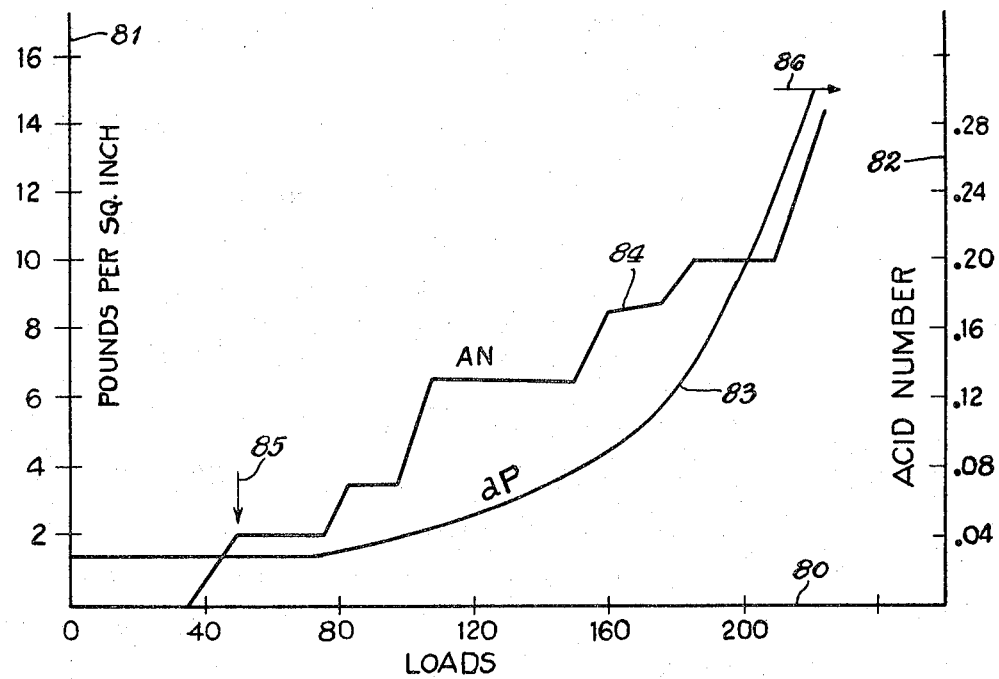
FIG. 2 is a graph showing the relation of differential pressure across the filter and the fatty acid content.

FIG. 2 is a graph showing conditions which develop when starting operations with fresh perchlorethylene, and flowing solvent through the clothes at the rate of about 6 gallons per minute for about four minutes for each load of clothes cleaned. The horizontal axis 80 is scaled to the number of 8-lb. loads. The left hand vertical axis 81 is scaled to the differential pressure across the filter in pounds per sq. inch (p.s.i.). The right hand vertical axis 82 is scaled to the acid number. Curve 83 represents the differential pressure (DP). Curve 84 represents the acid number (AN).

As the acid number increased the differential pressure increased. Arrow 86 indicates where the DP reached 15 p.s.i. and the acid number approached the said prior art limit of 0.30. No control of the acid number was practiced.

Figure 3:
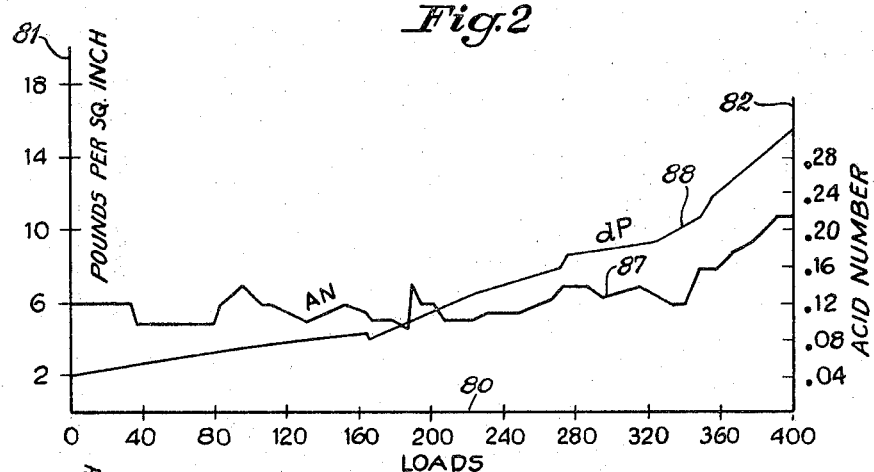
FIG. 3 is a graph showing how the life of a filter is increased by replacing a portion of the recycled solvent with fresh solvent.

FIG. 3 illustrates the control of fatty acids by replacing a portion of the solvent. Ten gallons of used solvent every six loads was replaced with fresh perchlorethylene. In this test, the filter was first precoated with a layer of diatomaceous earth to provide a tighter total filter medium of fabric plus precoat in order immediately to filter out fines which might pass through the fabric, and thus to start operations with a filter cake. The axes of the graph are designated as in FIG. 2. By this procedure the AN curve 87 remained below 0.16 up to 360 loads. As it then rose above 0.16 the DP curve 88 began to rise and was allowed to go to 15 p.s.i. before discontinuing the operation at 400 loads.

Figure 4:
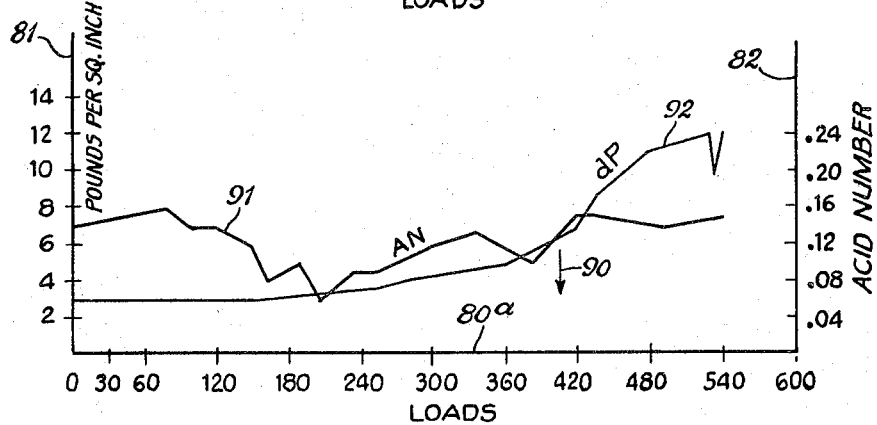
FIG. 4 is a graph showing increase in filter life by adding an adsorbent.

FIG. 4 shows the control by adding an adsorbent from time to time, specifically, at each load. The filter was not precoated. The graph has the same vertical axes 81 and 82 as in FIGS. 2 and 3. The horizontal axis 80ª is modified to show more loads per unit length.

The solvent initially had a fatty acid number just below the maximum of 0.16. At each load 12 grams of a 50-50 mixture of diatomaceous earth and synthetic magnesium silicate were added, up to 408 loads at the point indicated by arrow 90, when it was reduced to 8 grams up to 537 loads, at which point usefulness of the filter was exhausted, after cleaning 4344 pounds of clothes.

Graph 91 shows how the acid number gradually reduced, then rose again to just below 0.16. Near the point 90 the acid number began to rise, and with it the differential pressure graph 92.

The present invention is not limited to the apparatus as shown and may be practiced in other apparatus within the scope of the appended claims.

I claim:

1. In the method of dry-cleaning cloths by subjecting soiled clothes to the cleaning action of detergent-charged perchlorethylene as solvent which solvent is free of undissolved water, wherein the solvent is repeatedly reused for cleaning and recirculated in a system including both filtering and storing the solvent, wherein the recirculated solvent accumulates suspended solids and impurities comprising dissolved non-volatile solids including titratable acid, wherein said filtered solids accumulate on a filter medium and participate in the filtering action and become part of the filter, and wherein continued use of the solvent leads to increased pressure differential across the filter by blinding the filter, thereby minimizing the number of loads which can be dry-cleaned before changing the filter, the improvement comprising maintaining the acid number of the circulating solvent at a value not over 0.16 during substantially all the time during which a filter is in use in said recirculating system, and simultaneously maintaining the solvent free of water in excess of 50% of its capacity to dissolve water, thereby prolonging the life of the filter.

2. The improvement of claim 1 in which said maintaining of the acid number of the circulating solvent at a value not over 0.16 during substantially all the time during which a filter is in use is effected in part at least by removing from the total solvent in the system at least some of the non-volatile solids.

3. The improvement of claim 1 in which repeatedly a portion of the solvent containing said dissolved non-volatile solids is removed and replaced with perchlorethylene.

4. The improvement of claim 1 in which repeatedly a small quantity of a non-caking solid adsorbent for said dissolved non-volatile solids is added to the solvent containing said titratable acid which solvent is to be filtered whereby to remove said adsorbent.

5. The improvement of claim 1 in which repeatedly a small quantity of a caking adsorbent for said dissolved non-volatile solids and a small quantity of filter aid are added to the solvent containing said titratable acid which solvent is to be filtered whereby to remove said adsorbent.

6. The improvement of claim 1 in which repeatedly a small quantity of non-caking material comprising synthetic magnesium silicate adsorbent for said dissolved non-volatile solids is added to the solvent containing said titratable acid which solvent is to be filtered whereby to remove said adsorbent.

7. The improvement of claim 1 in which repeatedly a small quantity of finely divided caking synthetic magnesium silicate adsorbent for said dissolved non-volatile solids and a small quantity of filter aid are added to the solvent containing said titratable acid which solvent is to be filtered whereby to remove said adsorbent.

8. The improvement of claim 1 in which repeatedly a small quantity of finely divided caking synthetic magnesium silicate adsorbent for said dissolved non-volatile solids and a small quantity of diatomaceous earth are added to the solvent containing said titratable acid which solvent is to be filtered whereby to remove said adsorbent.

9. The improvement of claim 1 in which the solvent containing said dissolved non-volatile solids is repeatedly subjected to the adsorbing action of an adsorbent for said dissolved non-volatile solids and the solvent is then removed from said adsorbent.

10. The improvement of claim 1 in which the solvent containing said dissolved non-volatile solids is repeatedly subjected to the adsorbing action of synthetic magnesium silicate adsorbent and the solvent is then removed from said adsorbent.

References Cited

UNITED STATES PATENTS

| | | | |
|---|---|---|---|
| 1,704,604 | 3/1929 | Halfied | 8—142 |
| 3,070,463 | 12/1962 | Barday | 8—142 X |
| 3,099,626 | 7/1963 | Riede | 8—142 X |
| 3,199,679 | 8/1965 | Salyer | 8—142 X |
| 3,201,346 | 8/1965 | Benedict | 8—142 X |

LEON D. ROSDOL, *Primary Examiner.*

MAYER WEINBLATT, *Examiner.*